Dec. 7, 1965  J. S. YAMPOLSKY  3,221,982
TURBOCIRCULATOR
Filed Aug. 10, 1964  3 Sheets-Sheet 1
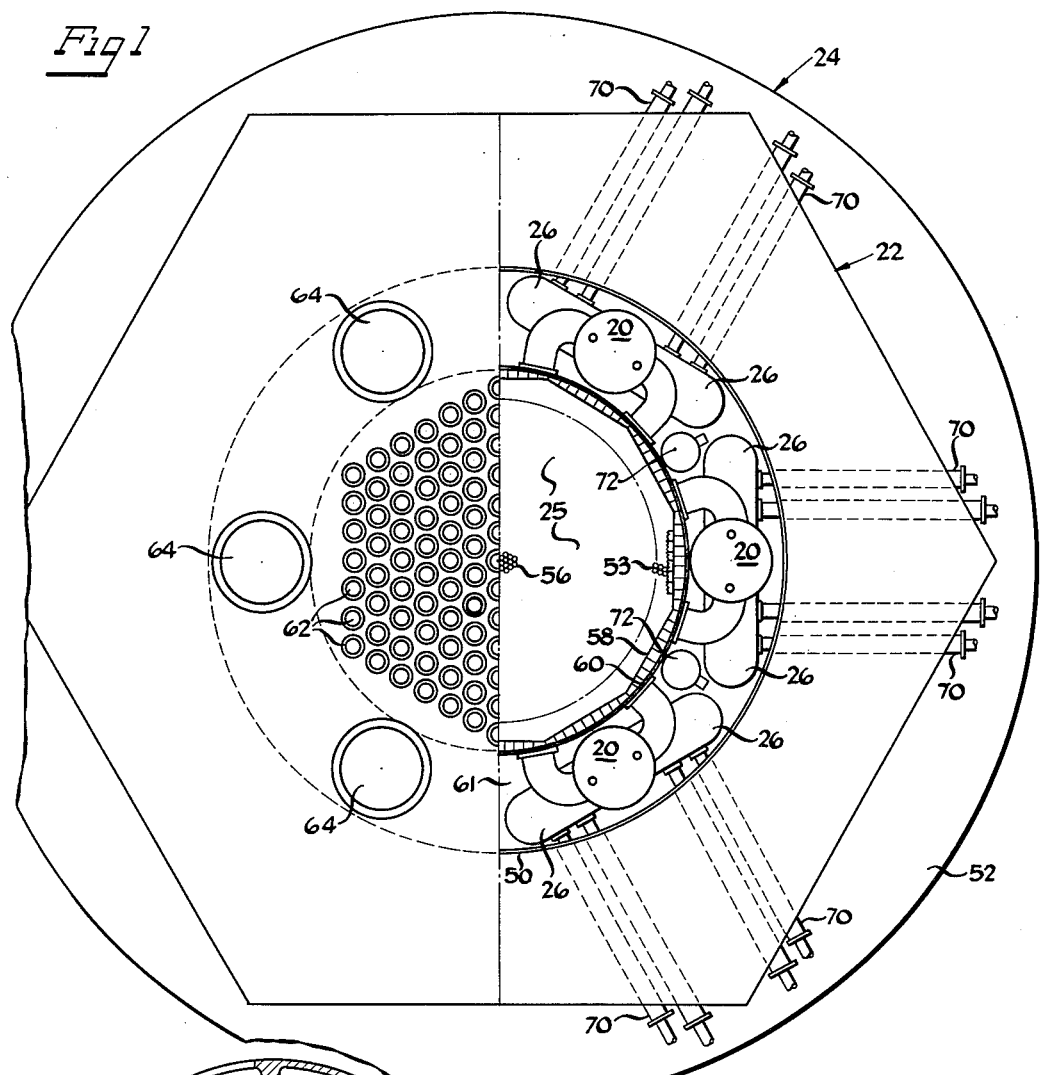
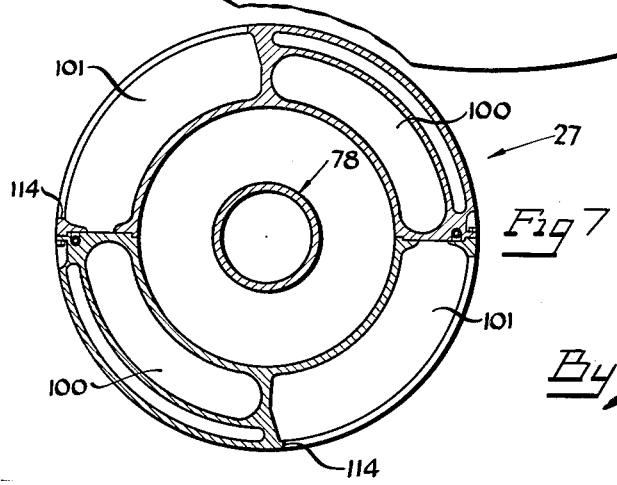
Inventor
Jack S. Yampolsky
By Roland A. Anderson
Atty

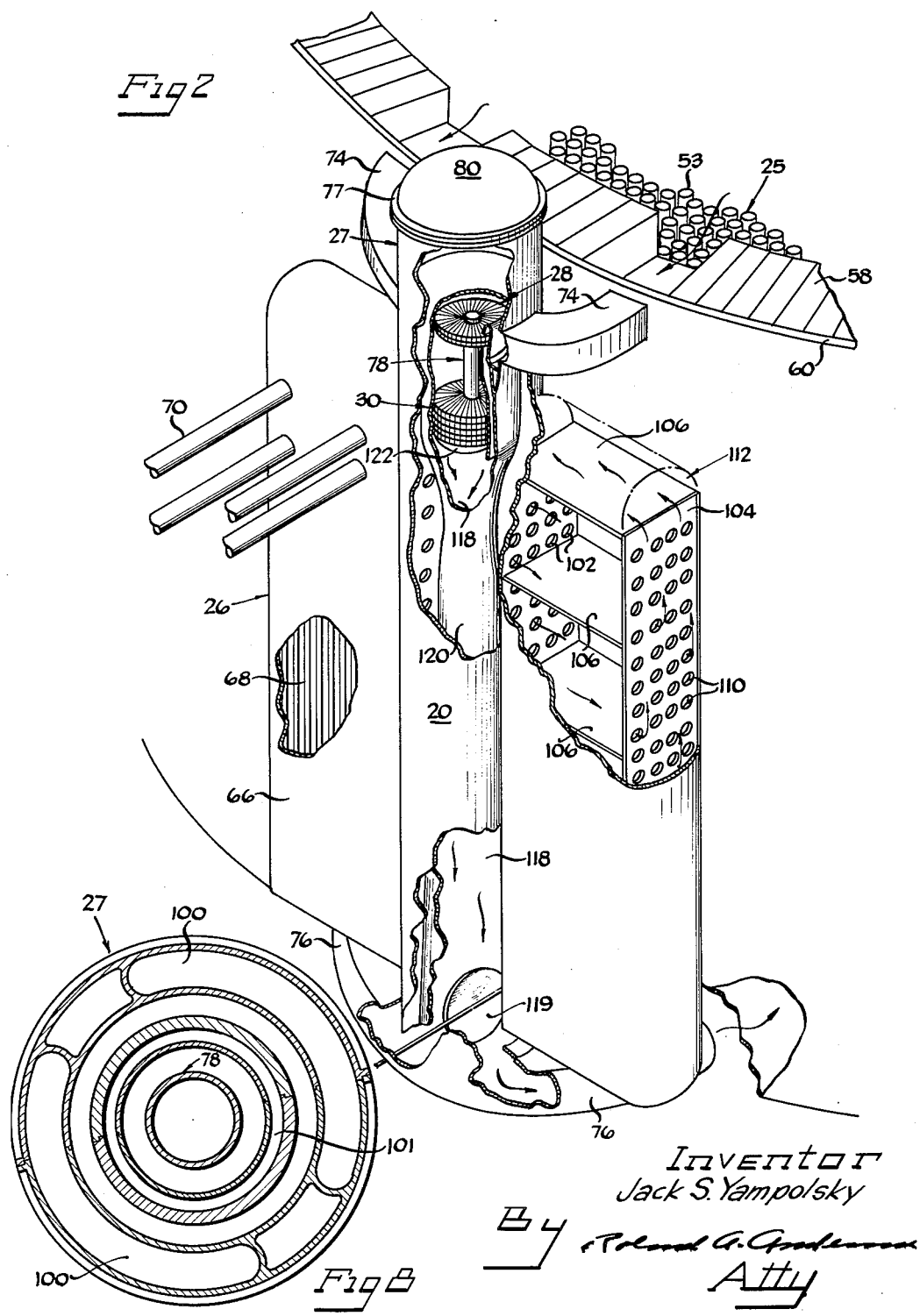

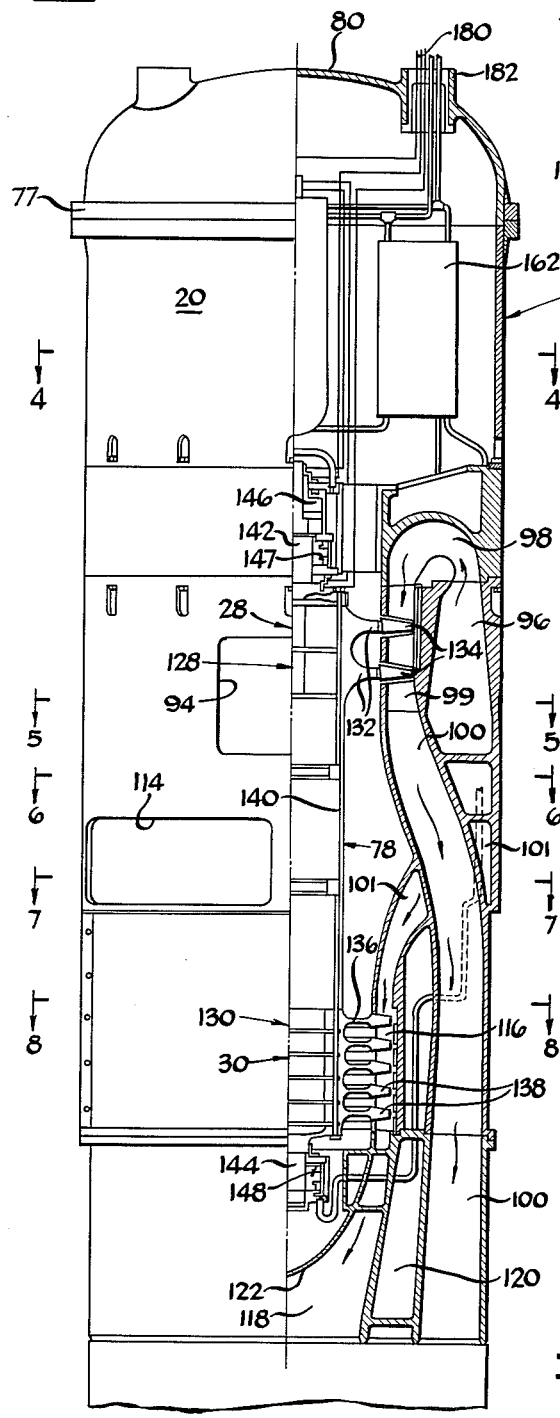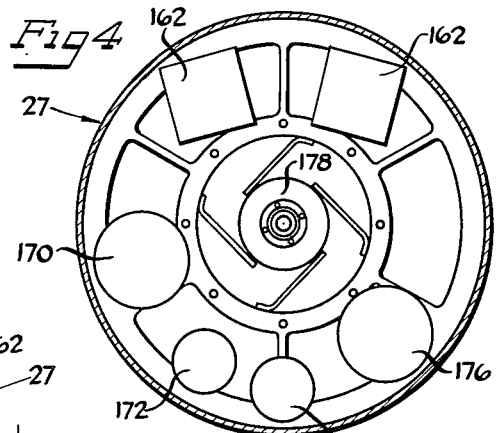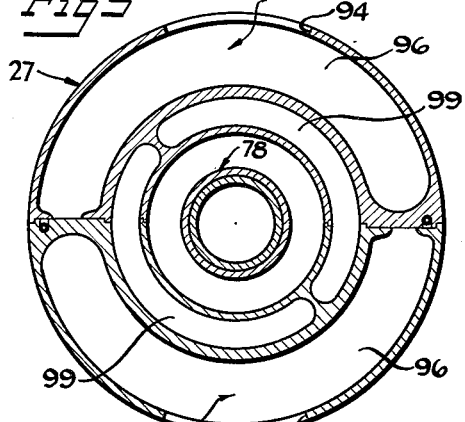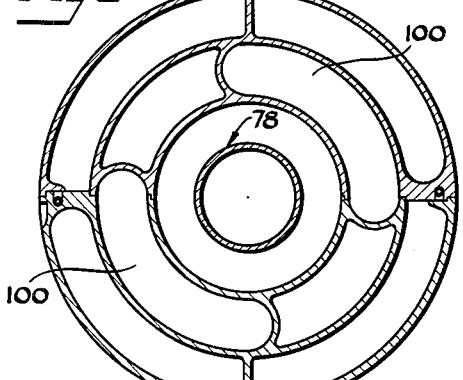
Inventor
Jack S. Yampolsky

United States Patent Office 3,221,982
Patented Dec. 7, 1965

3,221,982
TURBOCIRCULATOR
Jack S. Yampolsky, San Diego, Calif., assignor, by mesne assignments, to the United States of America as represented by the United States Atomic Energy Commission
Filed Aug. 10, 1964, Ser. No. 388,737
10 Claims. (Cl. 230—116)

The present invention relates generally to a gas turbocirculator, and more particularly to a gas turbocircular especially adapted to be contained within a pressure vessel.

Gas turbocirculators, which combine in a single unit a compressor to move or circulate a gas and a turbine which derives energy from the gas to drive the compressor, have been used in various thermodynamic systems. For example, such gas turbocirculators have been used in nuclear reactor systems in which a gaseous coolant medium such as helium or carbon dioxide, under pressure, is circulated through the primary heat extraction system, i.e., from the reactive core of the reactor to the associated steam generating apparatus of the system. However, such turbocirculators have generally been located externally of the pressure vessel that encloses the primary heat extraction system. Locating the turbocirculator outside of the pressure vessel requires rather long ducting and sufficiently heavy construction of the ducting and the housing or casing of the turbocirculator to withstand the gas pressure of the system. This leads to higher costs for plant, energy losses as the gas passes through the long external ducting, and problems of gas losses through duct connections.

The turbocirculator of the present invention is adapted to be contained within the pressure vessel of a thermodynamic system, permitting the casing to be of relatively thin-walled construction and allowing the use of minimum lengths of ducts or conduits. The turbocirculator is compact and so shaped that it conveniently occupies a pressure vessel of minimum size. Further advantages are provided by having the auxiliary or accessory apparatus for the turbocirculator included within the turbocirculator casing. At the same time, the turbocirculator is constructed so that the gas passes through it with a minimum of energy loss. Further, the turbocirculator and its accessory apparatus are so constructed as to be capable of continuous unattended operation over extended periods of time.

It is a principal object of the present invention to provide a novel and improved turbocirculator for use in a thermodynamic system.

Another object of the invention is to provide such a turbocirculator adapted to be contained within a pressure vessel so that relatively thin-walled construction may be utilized and a minimum length of ducting is required.

It is another object of the present invention to integrate the accessory apparatus for such a turbocirculator so that it is also contained within the turbocirculator casing.

It is another object of the present invention to provide a novel and improved turbocirculator having a compact size and shape permitting it to be conveniently housed in a pressure vessel of minimum size.

It is another object of the invention to provide a novel and improved turbocirculator which is constructed and arranged for containment within a pressure vessel of a thermodynamic system for long periods of continuous unattended operation.

Another object of the present invention is the provision of a novel and improved turbocirculator which is constructed and arranged to minimize flow energy losses through the turbocirculator.

It is another object of the present invention to provide a novel and improved turbocirculator which is compact, simple and economical to construct, yet which is efficient, durable and dependable in operation.

Other objects and advantages of the present invention will become more apparent from the following description and the associated drawings, wherein:

FIGURE 1 is a plan view in partial section of a portion of a gas-cooled nuclear reactor which incorporates turbocirculators embodying various features of the present invention;

FIGURE 2 is a diagrammatic perspective view, with parts broken away, of a portion of the reactor shown in FIGURE 1, showing in particular one of the turbocirculators in relation to the core of the reactor and steam generating apparatus of the reactor;

FIGURE 3 is a side elevational view in half section of the upper portion of the turbocirculator shown in FIGURES 1 and 2; and FIGURES 4 through 8 are plan sectional views taken generally along lines 4—4 through 8—8, respectively, of FIGURE 3, showing in particular the passageways or ducts for passage of gas through the turbocirculator.

While the turbocirculator of the present invention may be used with various thermodynamic systems, it is illustrated in connection with a gas-cooled nuclear reactor system. As shown in FIGURE 1, six gas turbocirculators 20 which embody the present invention are contained within a concrete pressure vessel 22 of a gas-cooled nuclear reactor 24. The turbocirculators 20 are arranged in the vessel around a centrally located reactor core 25 and each turbocirculator is connected to the core and to two steam generator units 26 that are also contained within the pressure vessel and aranged around the core. As shown generally in FIGURE 2, each turbocirculator 20 includes a vertically disposed relatively thin-walled casing 27 which houses a turbine 28, a compressor 30 and accessory apparatus. The working medium in both the compressor and the turbine of each turbocirculator is the coolant gas of the reactor, which facilitates the incorporation of the turbocirculators within the pressure vessel.

The flow of the coolant-gas of the reactor 24 is through the core 25, where the gas is heated, and then to the turbines 28 of the turbocirculators to power the turbines. The gas flows from the turbines to associated steam generator units 26 and then to the compressors 30 of the turbocirculators. The compressors are driven by the respective turbines and circulate the cooler gas back to the core to complete the cycle.

Now considering the illustrated structure in further detail, the gas-cooled nuclear reactor 24, which is associated with the illustrated turbocirculators 20, is shown in FIGURES 1 and 2. The prestressed concrete primary pressure containment vessel 22 is an upright, generally tubular structure closed at its upper and lower ends. In horizontal cross section, the prestressed vessel 22 is hexagonally shaped externally and cylindrically shaped internally, having an inner layer of insulation 50. A generally cylindrical secondary containment vessel 52 of steel or similar material surrounds the prestressed vessel 22. The primary coolant-gas or medium used by the illustrated reactor is preferably helium.

The core 25 of the illustrated reactor is formed of a generally cylindrical bundle of vertically extending fuel and control rod elements 56 centrally disposed within the prestressed vessel. The illustrated core 25 is surrounded by a reflector structure 58 which in turn is enclosed by a cylindrical core-containing structure 60. The diameter of the core-containing structure 60 is sufficiently smaller than the inner diameter of the concrete vessel 22 so as to provide a cylindrical annulus 61 therebetween in which the six cylindrical turbocirculators are positioned upright and circumferentially spaced. The turbocirculators 20 are thus positioned adjacent to the core and extend substantially the full height of the core. As seen in FIGURE 1, each turbocirculator is flanked on opposite sides by a pair of the steam generator units 26. A plurality of core access nozzles 62 are provided in the upper wall of the primary containment vessel 22 above the core 25 and one turbocirculator access nozzle 64 is provided in that upper wall above each of the turbocirculators 20 (FIGURE 1).

As shown best in FIGURE 2, each of the illustrated steam generator units 26 includes a housing 66. Each housing 66 incloses steam generator tube bundles 68 that are connected to main steam headers 70. The headers 70 extend radially outwardly relative to the reactor. A suitable emergency cooling system 72 for the reactor may also be provided in the annulus 61.

Towards the upper end of each turbocirculator, at a location adjacent the upper end of the core 25, a pair of short core outlet ducts 74, one at either side of the turbocirculator, connect the upper end of the turbocirculator to spaced-apart positions at the upper end of the core. More particularly, each duct 74 is secured to the core-containment structure 60 over a suitable opening therein and then describes a short arc or curve to where it is secured to one side of the turbocirculator. At the lower end of each turbocirculator, which is adjacent the lower end of the core, a generally flat horizontally extending core inlet duct structure 76 is provided. More particularly, each core inlet duct structure 76 is in the form of a hollow partial disk which connects with an associated opening or openings in the core-containment structure. Thus, a minimum length of connecting ducting or conduit between the core and the turbocirculators is required, and since each turbocirculator is entirely within the pressure vessel, the only pressure gradient with which the ducting and the turbocirculator casing or housing must contend is the relatively small gradient across the turbocirculator itself. This minimizes loss of costly helium coolant-gas as well as reducing the cost of the turbocirculators and the ducting.

The turbocirculator 20 includes the elongated, generally tubular, vertically extending, relatively thin-walled housing or casing 27 which connects with the core inlet duct structure 76 at its lower end and is closed at its upper end by a dome 80. The casing 27 may be formed conveniently from fabricated sections which are then secured together. The illustrated casing 27 is formed adjacent its uper end with an outwardly extending circumferential support flange or lip 77 which is adapted to seat upon a suitable mating annular shoulder provided in one of the access nozzles 64 in the upper wall of the pressure vessel. The turbocirculator is thereby supported or suspended in position extending down into the pressure vessel. This affords relatively easy placement and removal of the turbocirculator in the reactor vessel. Suitable seals (not shown) may be provided to maintain the pressurized integrity of the vessel. Disposed immediately below the dome 80 are various elements or components of turbocirculator accessory apparatus which will be described more fully below.

An elongated vertically disposed unitary rotor 78 is rotatably mounted centrally of the casing 27 immediately below the elements of accessory apparatus. The rotor 78, together with means in the casing 27, comprises the turbine 28 and the compressor 30. The illustrated rotor 78 will be described in further detail below.

The illustrated casing 27 includes means defining integrally formed inlet and outlet ducts, passageways or channels that direct the flow of gas to and from the turbine and the compressor. In general, the hot gas from the core outlet ducts 74 enters the upper end of the turbocirculator casing 27 and is accelerated into and directed down through the turbine 28. The gas leaving the turbine is decelerated or diffused and travels downwardly of the casing, passing outwardly into the two adjacent opposed steam generator units 26 over their full height. After the gas circulates through the steam generator units, it reenters the turbocirculator casing, accelerating into and passing down through the compressor 30. The gas is again decelerated as it passes downwardly from the compressor to the lower end of the casing and into the core inlet duct structure 76.

As shown best in FIGURES 3 and 5, an entrance or mouth 94 is provided in each side of the casing outer wall in line with one of the core outlet ducts 74 to afford access of the hot primary gas from the reactor core into a pair of turbine manifold chambers 96 in the casing. As shown in FIGURE 5, each of the manifold chambers 96 is a generally annular-shaped void or cavity extending approximately half the distance around the casing. The upper end of each of the chambers 96 communicates with a turbine inlet duct 98 that directs the gas flow first radially inwardly of the unit and then downwardly through the annular turbine passageway 99 of the turbine 28.

The turbine manifold chambers 96 and the inlet ducts 98 are proportioned to cause the hot gas to accelerate. More particularly, as shown generally in FIGURE 3, the flow cross section of the manifold chamber 96 and the inlet 98 decrease as the gas passes upwardly, then inwardly, and then downwardly. It may be noted that the relatively slowly moving hot gas is turned approximately 180° between entering the unit and entering the turbine.

The casing 27 includes means that define a pair of opposed elongated vertically extending turbine outlet ducts 100 which received the flow from the turbine and serve to diffuse or decelerate the flow through a controlled or gradual increase in the flow cross section of the ducts. Each turbine outlet duct 100 which is a generally annular segment in horizontal section, receives about one-half of the outlet flow of hot gas from the turbine to divide or bifurcate that flow. Initially, the ducts 100 gradually divert the flow radially outwardly from the lower end of the annular turbine passageway 99 to a path generally adjacent the outer wall of the casing. As shown best in FIGURES 3 and 7, the casing 27 also forms, below the turbine but above the compressor 30, a pair of compressor inlet ducts 101 which are disposed intermediate the turbine outlet ducts 100. The compressor inlet ducts 101 extend generally radially inwardly while the turbine outlet ducts 100 extend generally axially downwardly to provide a crossed or interleaved configuration. The turbine outlet ducts 100 extend downwardly of the casing at either side thereof as opposed annular segments (FIGURE 8) to adjacent the lower end of the casing (FIGURE 2). The turbine outlet ducts 100 provide a controlled rate of diffusion or deceleration through peripheral as well as radial changes in dimension such that the desired gradual increase in flow cross section is achieved.

As shown generally in FIGURE 2, each of the turbine outlet ducts 100 passes downwardly adjacent one side of the turbocirculator and serves as a manifold for the adjacent steam generator unit 26. The portion of the thin casing wall which comprises the outer wall of each turbine outlet duct 100 also comprises the inner end wall of the adjacent housing 66. Suitable inner openings, apertures or passageways 102 are provided over substantially this entire portion of casing wall to permit the gas leaving the turbine and flowing through the turbine outlet duct 100 to enter the adjacent housing 66. Each duct 100 extends substantially the full length of the associated housing 66 and is closed at its lower end. Each outlet duct 100 is proportioned so as to maintain a generally increasing static pressure over the length of the duct while avoiding flow separation and resultant energy losses in the gas flow through the duct.

Each housing 66 is provided with a vertical distribution baffle 104 that is spaced inwardly from the outer end wall of the housing 66 and with a plurality of vertically-spaced horizontally-disposed guide or baffle plates 106 that extend between the baffle 104 and the inner end wall of the housing. The uppermost horizontal baffle plate 106 is spaced somewhat below the upper wall of the housing. The vertical distribution baffle 104 is provided with a plurality of outer openings or apertures 110 dispersed over substantially its entire surface. The flow of the gas, as shown by the arrows in FIGURE 2, is into the inner end of a housing 66 through the inner apertures 102 and outwardly within the housing past the steam generator tube bundles 68. The gas then flows outwardly through the outer apertures 110 of the vertical distribution baffle 104 and upwardly through the vertical passageway defined between that vertical baffle 104 and the outer end wall of the housing 66. The flow then turns back inwardly within the housing, passing between the uppermost horizontal baffle plate 106 and the upper wall of the housing. A steam generator outlet duct 112 is thus formed along the outer and upper edge of the housing. These edges of the housing may be curved or round to facilitate the flow. The inward flow of gas across the upper end of each housing 66 enters a suitable entrance 114 in the wall of the casing 27 to one of the compressor inlet ducts 101.

As noted above and shown best in FIGURES 3 and 6, the compressor inlet ducts 101 cross or interlace with the turbine outlet ducts 100. The inlet ducts 101 converge radially inwardly while expanding peripherally or circumferentially to connect with an annular compressor passageway 116. The passageway 116 is separated from and spaced inwardly from the adjacent portions of the turbine outlet ducts 100, as illustrated in FIGURES 3 and 8. The compressor inlet ducts 101 are proportioned to provide acceleration of the entering gases by a progressive decrease in the cross sectional flow area of the ducts 101.

The casing 27 further includes means which form a compressor outlet duct 118 that receives the gas from the compressor 30 and directs it downwardly the remaining height of the turbocirculator to the core inlet duct structure 76. A shutoff valve 119 is provided at the lower end of the compressor outlet duct 118 to regulate or close the flow from the compressor to the core. As shown in FIGURES 2 and 3, the compressor outlet duct 118 has a generally tubular outer wall 120 which is spaced radially inwardly of the turbine outlet ducts 100 and a downwardly directed dome 122 that is located centrally of the casing immediately below the compressor. This dome 122 provides an inner wall for the compressor outlet 118 and limits it to an annular configuration immediately below the compressor. The dome 122 and the outer wall 120 are proportioned and arranged for controlled acceleration or diffusion of the gas leaving the compressor. Initially, the annular passageway with progressively increasing cross sectional flow area is provided. Below the dome 122 the passageway becomes circular to accommodate a solid cylindrical mass of gas flowing downwardly within the tubular outer wall 120 of the compressor outlet duct 118. After the flow of gas passes the lower end or termination of the dome 122, there is a transitional condition, presenting a problem of possible wake. Such wake is suppressed by a continued decrease in the diameter of the tubular outer wall 120 to a point beyond or below the termination of the dome 122, after which the diameter of the wall 120 increases at a gradual or controlled rate to reduce the gas velocity as desired.

The illustrated arrangement of ducts allows flow of gas in the same direction through both the turbine 28 and the compressor 30, which is desirable to balance aerodynamic thrust as will be explained more fully. It also allows the available length of the reactor concrete pressure vessel to be used for the diffusion or deceleration of gas exhausted from both the turbine and from the compressor. This involves in effect turning the flow of gas around to return it to the compressor without any undesirable abrupt changes in direction or speed of diffusing gas leaving either the turbine or the compressor as would result in energy losses.

More particularly, high axial velocities are utilized in the passageways of the turbine and the compressor to minimize the number of stages required and their outer diameter. When these velocities are changed to lower velocities in the passageways leading to the steam generating apparatus and the core, energy losses result. Such losses can be considered either as included in lower component efficiencies or as additional required pumping power. The effect is the same so far as the turbocirculator cycle is concerned, resulting in higher compressor pressure ratio which would add to the size and complexity of the apparatus required.

These losses can be minimized by controlling the rate of deceleration or diffusion of the gas and by avoiding any abrupt changes in its direction of flow. In this connection, the flow through the diffusers or outlet ducts is against an adverse pressure gradient. If the gradient is permitted to increase too rapidly, flow separation results in attendant energy loss. Since it is the length of the diffusor for a given area ratio across the diffusor which determines the magnitude of the pressure gradient, flow separation from too high a gradient is avoided by making the diffusors or outlets of the illustrated turbocirculator sufficiently long to provide controlled or gradual deceleration without any abrupt changes in direction of the flow.

With regard to diffusion or deceleration from the turbine, it will be noted that this diffusion is accomplished entirely within an annulus and is accomplished by controlling the duct dimensions peripherally as well as radially. The use of peripheral dimension control facilitates effectively crossing of the turbine outlet flow with the compressor inlet flow.

While there is a favorable pressure gradient at the inlets to the turbine and compressor which reduces the possibility of flow separation, the bifurcated inlet flow into the compressor is desirably balanced to avoid mixing wakes and pre-rotation of the entering gas stream, although the acceleration of the gas into the compressor tends to diminish extension of wakes into the compressor. The illustrated turbocirculator operates at constant axial velocity and the shape of the inlet ducts which are provided are consistent so that the resulting velocity at the eye of the machine is constant.

The illustrated arrangement of ducts minimized the presence of hot and cold gas flowing in adjacent passageways, which reduces problems of major thermal stress gradients and in effect insulates the hot and cold passageways from each other. Ample voids are provided adjacent the ducts in the illustrated structure and these voids may be filled with insulation material as desired. In particular, the illustrated turbocirculator serves to isolate, confine and limit as much as possible the hot gas passages between the core and the turbine inlet and the turbine outlet and the steam generating apparatus. In this regard, the annular space or void between the turbine outlet ducts 100 and the concentrically arranged inner compressor outlet duct 118 minimizes such problems. Further, bifurcating the hot outlet flow from the turbine and the cooler inlet flow to the compressor and causing them to cross or interleave at generally normal directions to one another further serves to minimize these problems.

The illustrated rotor 78 includes a two-stage turbine section 128 at its upper end and a five-stage compressor section 130 at its lower or other end. The turbine section 128 is formed of two turbine disks 132 to which are secured suitable radially extending turbine blades 134. The compressor section 130 is formed of five compressor disks 136 to which are secured suitable radially extending compressor blades 138. A central connecting torque tube 140, an upper shaft end 142, and a lower shaft end 144 connect to the disks 132 and 136 to provide a common vertical rotor shaft supporting the turbine section 128 adjacent its upper end and the compressor section 130 adjacent its lower end.

The rotor 78 is supported or suspended vertically from its upper end by a thrust bearing 146 mounted in the casing 27. The thrust bearing 146, which may be of the tilting-pad oil-flooded Kingsbury type, supports the upper shaft end 142. The rotor is rotatably aligned by an upper journal or radial bearing 147 and a lower journal or radial bearing 148 which are mounted in the casing and engage, respectively, the upper and lower shaft ends 142 and 144.

In general, the illustrated turbocirculator is of dynamic construction in that moving parts are maintained separated by fluid for minimum wear and long life. The illustrated turbocirculator uses an oil lubrication system because of the large rotor weight which must be handled at starting. The turbocirculator is constructed so that this load on the thrust bearing 146 diminishes with speed due to aerodynamic thrust to give longer bearing life. More specifically, in the illustrated structure the thrust of the turbine and the compressor operate against one another. This is achieved by having the same direction and sense of flow through both the turbine and the compressor while the pressure increases through the compressor but decreases through the turbine. The thrust of the compressor, which is upward, is larger by the amount of flow losses in the entire coolant system than the thrust of the turbine, which is downward, so that the resultant net thrust is upward. Thus, the vertical orientation of the rotor affords a resultant thrust load opposite or tending to balance the gravitational load. This reduces the loads on the thrust bearing 146, which adds to its life and lengthens the time for which the turbocirculator can operate continuously without attention. The loads on the journal or radial bearings 147 and 148 are minimal since they carry only loads imposed by unbalance and misalignment.

In the illustrated oil lubrication system the oil is circulated through a closed loop or circuit through heat exchanging means, through the bearings, and then back to the heat exchanging means.

As shown in FIGURE 3, oil piping or lines 160 mounted in the casing 27 connect the bearings 146, 147 and 148 to heat transfer means in the form of heat exchangers 162 that are mounted in the upper end of the casing. The oil piping 160 runs through voids in the casing and is not exposed to either turbine or compressor gas. Oil pumps (not shown) are integral with and are operated by rotation of the rotor 78. Such pumps may be in the form of a row of vanes mounted on the rotor. As noted above, when the turbocirculator is operative, the thrust load opposes the gravitational load, thus reducing the thrust bearing loading.

However, when the turbocirculator is inoperative, the entire weight of the rotor acts in a downwardly direction on the thrust bearing, and for startup it is necessary to introduce an oil film under sufficient pressure to prevent metal-to-metal contact in the thrust bearing. While sufficient oil is retained in the bearing to provide some lubrication at start-up even without an external pressure source, the illustrated apparatus includes an auxiliary oil pump (not shown) for providing oil to the thrust bearing at start-up and in case of failure of the main oil pumps.

Leakage of oil from the bearings into the main gas stream is prevented by a combination of oil and gas seals (not shown). Both of the fluids are allowed to leak into a chamber from which the mixture flows into an oil-gas separating system where they are separated from each other and returned to their respective storage systems.

More specifically, a buffer helium stream is bled from the compressor outlet and passed through a plateout trap 170 in the upper end of the casing to remove all but the gaseous fission products. The stream is then passed through a cooler 172 also in the upper end of the casing and sent to the seals. The returning mixture of oil and helium is sent to a separator 174 in the casing upper end, where the helium is separated and passed through an adjacently located absorption bed 176 for the removal of the oil vapor, then returned to the main gas stream at the inlet side of the compressor. The separated oil is sent to an oil make-up reservoir (not shown).

Thus, as shown best in FIGURES 3 and 4, various components of accessory apparatus are housed under the dome 80 at the upper end of the casing. A starting motor 178 is mounted concentrically above the rotor 78 while other components or elements of accessory apparatus including the above-mentioned heat exchangers 162, the plateout trap 170, the cooler 172, the separator 174 and the absorption bed 176 are arranged in a peripheral manner around the starting motor.

Since the accessory apparatus is housed within the casing, the turbocirculator is made self-contained, requiring only a few thin service lines 180 which extend through an access port 182 in the dome 80.

Shutdown seals (not shown) are used to keep oil from escaping from the bearing housing and getting into the main gas stream during shutdown. These are contact type seals, operated by pressurized helium. These seals are normally kept from contact by spring tension, so that they are ineffective during normal operation of the turbocirculator. The helium then pressurizes the seal immediately after shutdown.

When operation is initiated, the auxiliary oil pump is started and the rotor 78 is driven by the starting motor 178. The compressor 30 begins moving the gas-coolant through the reactor system and as hot gas from the reactor core 25 flows through the turbine 28, the latter is powered to assume the rotational driving of the rotor and the starting motor may be phased out. Similarly, the rotation of the rotor operates the integral oil pumps and the auxiliary oil pump may be stopped.

As noted above, after the gas acquires heat energy from the core, it accelerates into the turbine. It then is decelerated or diffused and flows to the steam generator units. After it has transferred heat energy to produce steam in the steam generator units, it accelerates again into the compressor. From the compressor it is then again decelerated, finally returning to the core to complete the cycle. The hot gas passing through the turbine drives it, and the compressor is thereby operated by the physical connection of the compressor with the turbine to circulate the gas through the system.

The compressor and turbine of the illustrated turbocirculators operate on a Brayton cycle to pump the coolant-gas. On the other hand, output or power is produced from the reactor by steam in a Rankine cycle. Since gas temperatures much higher than are usable in the steam cycle are possible in the high temperature gas-cooled reactor concept, and since the energy degradation that occurs in this Brayton cycle is at a higher thermodynamic potential than the Rankine cycle power conversion, the circulation of coolant-gas may be accomplished at no thermodynamic penalty to the power plant. Therefore, no external energy is required to drive the circulators. Furthermore, the possibility of increasing the pumping power to much greater levels than are possible with externally driven circulators without loss of efficiency opens the potential for further optimization of the entire nuclear steam supply of the reactor with attending reduction of size and cost.

Thus, each illustrated turbocirculator 20 with its auxiliary apparatus is in the form of a unitary package for use within a pressure vessel. As a result, the turbocirculator casing is thin-walled, and there is no long ducting required. Also, energy loss through the illustrated turbocirculator is minimized. The turbocirculator is not only compact and adapted to fit into a relatively small pressure vessel but is constructed to operate continuously for long periods without attention to permit long intervals between opening of the pressure vessel.

In certain systems a gas turbocirculator in accordance with this invention or the turbocirculator in combination with one or more of the other primary circuit components may be installed within a separate containment vessel of relatively simple construction.

Various modifications and changes may be made in the illustrated structure without departing from the spirit and scope of the present invention.

Various features of the present invention are set forth in the following claims.

What is claimed is:

1. A gas turbocirculator adapted for use within a pressure vessel, said turbocirculator comprising:
   (a) a vertically extending, generally cylindrical, relatively thin-walled casing,
   (b) a vertically extending rotor supported centrally within said casing, said rotor having an upper turbine section and a lower compressor section,
   (c) a first inlet duct extending to the turbine section of said rotor,
   (d) a first diffusor extending downwardly from the turbine section of said rotor, the outwardly facing wall of said diffusor forming part of said turbocirculator casing and being perforated to permit gas to pass therethrough, said first diffusor being proportioned so as to maintain a generally increasing static pressure throughout its length while avoiding flow separation and resultant energy losses in the gas stream passing therethrough,
   (e) a second inlet duct extending to the compressor section of said rotor, said compressor inlet duct being interleaved through said first diffusor, and
   (f) a second diffusor extending downwardly from the compressor section of said rotor to lower the velocity of the gas passing therethrough without flow separation prior to its leaving the turbocirculator.

2. A gas turbocirculator adapted for use within a pressure vessel, said turbocirculator comprising:
   (a) a vertically extending, generally cylindrical, relatively thin-walled casing,
   (b) a vertically extending rotor supported centrally within said casing, said rotor having an upper turbine section and a lower compressor section,
   (c) a first inlet duct extending to the turbine section of said rotor,
   (d) a first diffusor extending downwardly from the turbine section of said rotor and having a closed lower end, the outwardly facing wall of said diffusor forming part of said turbocirculator casing and being perforated to permit gas to pass therethrough, said first diffusor being proportioned so as to lower the velocity of the gas passing therethrough and to maintain a generally increasing static pressure throughout its length while avoiding flow separation and resultant energy losses in the gas stream passing therethrough,
   (e) a second inlet duct extending to the compressor section of said rotor, said compressor inlet duct being interleaved through said first diffusor, and
   (f) a second diffusor extending downwardly from the compressor section of said rotor to lower the velocity of the gas passing therethrough without flow separation prior to its leaving the turbocirculator, said second diffusor being located inwardly of said first diffusor.

3. A gas turbocirculator adapted for use within a pressure vessel, said turbocirculator comprising:
   (a) a vertically extending, generally cylindrical, relatively thin-walled casing,
   (b) a vertically extending rotor supported centrally within said casing, said rotor having an upper turbine section and a lower compressor section,
   (c) a first inlet duct extending through said casing to the turbine section of said rotor,
   (d) a first diffusor extending downwardly from the turbine section of said rotor and having a closed lower end, the outwardly facing wall of said diffusor forming part of said casing and being perforated to permit gas to pass therethrough, said first diffusor being proportioned so as to maintain a generally increasing static pressure throughout its length while avoiding flow separation and resultant energy losses in the gas stream passing therethrough,
   (e) a second inlet duct extending through said casing to the compressor section of said rotor, said compressor inlet duct being interleaved through said first diffusor, and
   (f) a second diffusor extending downwardly from the compressor section of said rotor to lower the velocity of the gas passing therethrough without flow separation prior to its leaving the turbocirculator.

4. A gas turbocirculator adapted for use within a pressure vessel, said turbocirculator comprising:
   (a) vertically extending, relatively thin-walled tubular casing adapted to be positioned in the pressure vessel adjacent to the core and steam generating apparatus of a nuclear reactor system,
   (b) a vertically extending rotor supported centrally within said casing, said rotor having an upper turbine section and a lower compressor section,
   (c) a first inlet duct extending from the core through said casing to the turbine section of said rotor,
   (d) a first diffusor extending downwardly from the turbine section of said rotor and having a closed lower end, the outwardly facing wall of said diffusor forming part of said turbocirculator casing adjacent to the steam generating apparatus, said first diffusor being proportioned so as to maintain a generally increasing static pressure throughout its length while avoiding flow separation and resultant energy losses in the gas stream passing therethrough,
   (e) a second inlet duct extending from the steam generating apparatus through said casing to the compressor section of said rotor, said compressor inlet duct being interleaved through said first diffusor, and
   (f) a second diffusor extending downwardly from the compressor section of said rotor to lower the velocity of the gas passing therethrough without flow separation prior to its leaving the turbocirculator to return to the core, said second diffusor being located inwardly of said first diffusor.

5. A gas turbocirculator adapted for use within a pressure vessel, said turbocirculator comprising:
   (a) a vertically extending, generally cylindrical, relatively thin-walled casing,
   (b) a vertically extending rotor supported centrally within said casing, said rotor having an upper turbine section and a lower compressor section,
   (c) a first inlet duct extending through said casing to the turbine section of said rotor,
   (d) a first diffusor extending downwardly from the turbine section of said rotor and having a closed lower end that is located at the lower end of said casing, the outwardly facing wall of said diffusor forming part of said turbocirculator casing and being perforated to permit gas to pass therethrough, said first diffusor being proportioned so as to maintain a generally increasing static pressure throughout its length while avoiding flow separation and resultant energy losses in the gas stream passing therethrough,
   (e) a second inlet duct extending through said casing to the compressor section of said rotor, said compressor inlet duct being interleaved through said first diffusor, and
   (f) a second diffusor extending downwardly from the compressor section of said rotor to the lower end of said casing to lower the velocity of the gas passing therethrough without flow separation prior to its leaving the turbocirculator.

6. A gas turbocirculator adapted for use within a pressure vessel, said turbocirculator comprising:
   (a) a vertically extending, generally cylindrical, relatively thin-walled casing,
   (b) a vertically extending rotor supported centrally within said casing, said rotor having an upper turbine section and a lower compressor section, (c) a first inlet duct extending through said casing to the turbine section of said rotor, (d) a first diffusor extending downwardly from the turbine section of said rotor and having a closed lower end, said first diffusor being divided into two separated sections, the outwardly facing wall of each of said diffusor sections forming part of said turbocirculator casing and being perforated to permit gas to pass therethrough, each of said first diffusor sections being proportioned so as to maintain a generally increasing static pressure throughout its length while avoiding flow separation and resultant energy losses in the gas stream passing therethrough, (e) a second inlet duct extending through said casing to the compressor section of said rotor, said compressor inlet duct being divided into two separated sections which are interleaved through said first diffusor sections, and (f) a second diffusor extending downwardly from the compressor section of said rotor to lower the velocity of the gas passing therethrough without flow separation prior to its leaving the turbocirculator, said second diffusor being located inwardly of said first diffusor.

7. A gas turbocirculator adapted for use within a pressure vessel, said turbocirculator comprising:

(a) a vertically extending, generally cylindrical, relatively thin-walled casing, the upper end of said casing providing space for housing various auxiliary components for the turbocirculator, (b) a vertically extending rotor having an upper turbine section and a lower compressor section, said rotor being rotatably supported within said casing immediately below said auxiliary component space, (c) a first inlet duct extending through said casing to the turbine section of said rotor, (d) a first diffusor extending downwardly from the turbine section of said rotor and having a closed lower end, the outwardly facing wall of said diffusor forming part of said turbocirculator casing and being perforated to permit gas to pass therethrough, said first diffusor being proportioned so as to lower the velocity of the gas passing therethrough and maintain a generally increasing static pressure throughout its length while avoiding flow separation and resultant energy losses in the gas stream passing therethrough, (e) a second inlet duct extending through said casing to the compressor section of said rotor, said compressor inlet duct being interleaved through said first diffusor, (f) a second diffusor extending downwardly from the compressor section of said rotor, said second diffusor being located inwardly of said first diffusor, said second diffusor being proportioned so as to lower the velocity of the gas passing therethrough without flow separation prior to its leaving the turbocirculator.

8. A gas turbocirculator adapted for use within a pressure vessel, said turbocirculator comprising:

(a) a vertically extending relatively thin-walled casing, the upper end of said casing providing space for housing various auxiliary components for the turbocirculator, (b) an oil lubricated dynamic thrust bearing supported in said casing below said space, (c) a vertically extending rotor having an upper turbine section and a lower compressor section, said rotor being vertically supported from its upper end directly below said auxiliary component space by a dynamic thrust bearing, (d) auxiliary components disposed in the upper end of said casing and including a heat exchanger for cooling the lubricating oil supplied to and delivered from said thrust bearing, (e) a first inlet duct extending through said casing to the turbine section of said rotor, (f) a first diffusor extending downwardly from the turbine section of said rotor and having a closed lower end, the outwardly facing wall of said diffusor forming part of said turbocirculator casing and being perforated to permit gas to pass therethrough, said first diffusor being proportioned so as to maintain a generally increasing static pressure throughout its length while avoiding flow separation and resultant energy losses in the gas stream passing therethrough, (g) a second inlet duct extending through said casing to the compressor section of said rotor, said compressor inlet duct being interleaved through said first diffusor, and (h) a second diffusor extending downwardly from the compressor section of said rotor to lower the velocity of the gas passing therethrough without flow separation prior to its leaving the turbocirculator.

9. A gas turbocirculator adapted for use within a pressure vessel, said turbocirculator being adapted for continuous operation for relatively long periods without requiring attention and comprising:

(a) a vertically extending, generally cylindrical, relatively thin-walled tubular casing, (b) a vertically extending rotor centrally supported within said casing, said rotor being vertically supported from its upper end by a dynamic thrust bearing and having an upper turbine section and a lower compressor section, said sections being proportioned and arranged to provide a net aerodynamic thrust upwardly of lesser magnitude than the weight of said rotor to relieve the load on said thrust bearing during operation of the turbocirculator and thereby increase the life of said bearing, (c) a first inlet duct extending through said casing to the turbine section of said rotor, (d) a first diffusor extending downwardly from the turbine section of said rotor and having a closed lower end, the outwardly facing wall of said diffusor forming part of said turbocirculator casing and being performated to permit gas to pass therethrough, said first diffusor being proportioned so as to maintain a generally increasing static pressure throughout its length while avoiding flow separation and resultant energy losses in the gas stream passing therethrough, (e) a second inlet duct extending through said casing to the compressor section of said rotor, said compressor inlet duct being interleaved through said first diffusor, and (f) a second diffusor extending downwardly from the compressor section of said rotor to lower the velocity of the gas passing therethrough without flow separation.

10. A gas turbocirculator adapted for use within a pressure vessel, said turbocirculator comprising:

(a) a vertically extending relatively thin-walled tubular casing, said casing being provided with an outwardly extending circumferential supporting flange adjacent its upper end, (b) a vertically extending rotor supported centrally within said casing, said rotor having an upper turbine section and a lower compressor section, (c) a first inlet duct extending through said casing to the turbine section of said rotor, (d) a first diffusor extending downwardly from the turbine section of said rotor and having a closed lower end, the outwardly facing wall of said diffusor forming part of said turbocirculator casing and being perforated to permit gas to pass therethrough, said first diffusor being proportioned so as to maintain a generally increasing static pressure throughout its length while avoiding flow separation and resultant energy losses in the gas stream passing therethrough, (e) a second inlet duct extending through said casing to the compressor section of said rotor, said compressor inlet duct being interleaved though said first diffusor, and (f) a second diffusor extending downwardly from the compressor section of said rotor to lower the velocity of the gas passing therethrough without flow separation.

References Cited by the Examiner

UNITED STATES PATENTS

| 2,233,031 | 2/1941 | Price | 230—116 X |
| 2,925,714 | 2/1960 | Cook | 230—116 X |
| 3,187,506 | 6/1965 | Switzer | 230—116 X |

MARK NEWMAN, *Primary Examiner.*

ROBERT M. WALKER, *Examiner.*